(12) United States Patent
Hustedt

(10) Patent No.: US 10,483,899 B2
(45) Date of Patent: Nov. 19, 2019

(54) MODULATION SCHEME FOR MULTIPHASE MACHINES

(71) Applicant: KSR IP Holdings, LLC, Wilmington, DE (US)

(72) Inventor: Eric Hustedt, Halifax (CA)

(73) Assignee: KSR IP Holdings, LLC, Wilmington, DE (US)

( * ) Notice: Subject to any disclaimer, the term of this patent is extended or adjusted under 35 U.S.C. 154(b) by 345 days.

(21) Appl. No.: 15/180,242

(22) Filed: Jun. 13, 2016

(65) Prior Publication Data

US 2016/0365821 A1 Dec. 15, 2016

Related U.S. Application Data

(60) Provisional application No. 62/174,205, filed on Jun. 11, 2015.

(51) Int. Cl.
*H02P 27/06* (2006.01)
*H02P 27/08* (2006.01)

(52) U.S. Cl.
CPC .................. *H02P 27/085* (2013.01)

(58) Field of Classification Search
CPC ........ H02K 29/08; H02K 29/00; H02K 29/06; H02P 6/14; H02P 27/08; H02P 6/085; H02M 7/53873
USPC ........................ 318/400.27, 400.41, 599, 811
See application file for complete search history.

(56) References Cited

U.S. PATENT DOCUMENTS

| 6,630,804 B2 * | 10/2003 | Moriya | H02P 6/08 318/106 |
| 7,259,530 B2 * | 8/2007 | Ochiai | B60L 3/0046 318/105 |
| 8,013,553 B2 * | 9/2011 | Taniguchi | B60L 1/003 318/400.27 |

(Continued)

FOREIGN PATENT DOCUMENTS

| CN | 1036110 A | 10/1989 |
| CN | 102771042 A | 11/2012 |
| JP | 2014-003783 A | 1/2014 |

OTHER PUBLICATIONS

Renato O.C. Lyra et al. "Torque Density Improvement in a Six-Phase Induction Motor With Harmonic Current Injection," In: IEEE Transactions on Industry Applications, Oct. 2002, vol. 38, No. 5, pp. 1351-1360.

(Continued)

*Primary Examiner* — Rina I Duda
(74) *Attorney, Agent, or Firm* — Dinsmore & Shohl LLP

(57) ABSTRACT

An electrical power system for a six-phase electric motor having a first set of three-phase windings and a second set of three-phase windings. A first pulse width modulator operates at a conversion frequency and at a first phase which converts a DC power source to an alternating current to power the motor. The first pulse width modulator is electrically connected to the first set of three-phase windings. Similarly, a second pulse width modulator also operates at the same conversion frequency and at a second phase which converts the DC power to alternating current to power the second set of three-phase windings. The first and second phases of the first and second pulse width modulators are offset between 80-100 degrees.

3 Claims, 2 Drawing Sheets

(56) References Cited

U.S. PATENT DOCUMENTS

| | | | |
|---|---|---|---|
| 2009/0033251 A1* | 2/2009 | Perisic | B60L 11/1868 318/105 |
| 2009/0033274 A1* | 2/2009 | Perisic | B60L 11/1868 318/771 |
| 2013/0271056 A1* | 10/2013 | Bunte | F03D 7/0224 318/503 |
| 2014/0246999 A1* | 9/2014 | Kezobo | B62D 5/0484 318/400.23 |

OTHER PUBLICATIONS

Chinese Office Action dated Sep. 19, 2019. Chinese Patent Application No. 201680031196.8.

\* cited by examiner

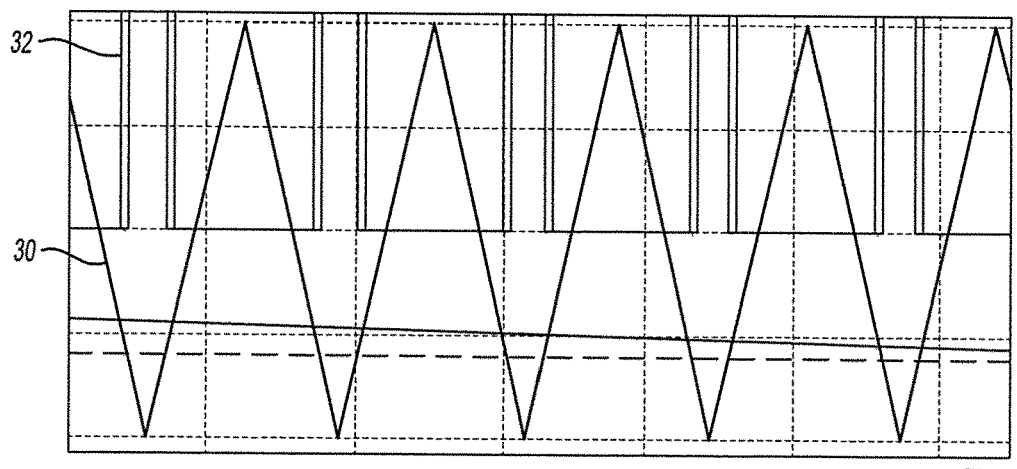
*Fig-2*
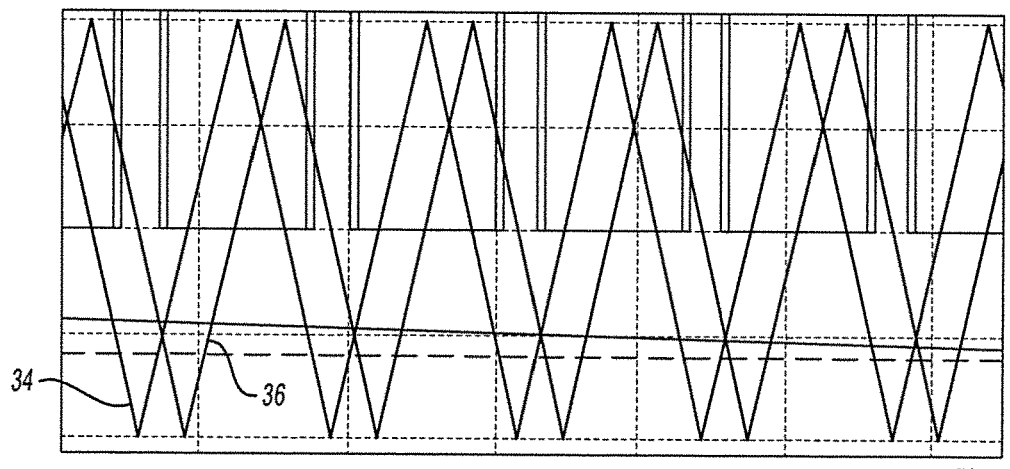
*Fig-3*
Chart showing simulated results comparing ripple currents for various modulator (TRI angle) phase shifts
| | SIN angle (40) | SIN angle (64) | I rip (Arms) (66) | Comment |
|---|---|---|---|---|
| Phase Current = 160Arms/phase (6 phases) | | | | |
| 40 | 0 | 0 | 155 | Equivalent to a Single 320Arms/phase 3 ph Machine |
| 42 | 30 | 0 | 125 | Motor Configuration for Project |
| 44 | 60 | 0 | 111 | True 6 Phase Machine |
| 46 | | | | |
| 48 | 30 | 0 | 125 | |
| 52 | 30 | 30 | 122 | |
| 57 | 30 | 60 | 100 | |
| 56 | 30 | 70 | 93 | |
| 54 | 30 | 80 | 89 | |
| 55 | 30 | 90 | 87 | |
| 58 | 30 | 100 | 89 | |
| 60 | 30 | 110 | 93 | |
| 62 | 30 | 180 | 126 | |
*Fig-4*

MODULATION SCHEME FOR MULTIPHASE MACHINES

CROSS-REFERENCE TO RELATED APPLICATIONS

This application claims priority of U.S. Provisional Application No. 62/174,205 filed Jun. 11, 2015, the contents of which are incorporated herein by reference.

BACKGROUND OF THE INVENTION

I. Field of the Invention

The present invention relates to a power source for a multiphase electric machine.

II. Description of Related Art

Three-phase voltage source inverters (VSI) are commonly used to convert DC voltage into AC voltage to drive motors. Typically, the VSI modulates the DC voltage into three AC voltages by using pulse width modulation (PWM) techniques and power devices. The phases of the three AC voltages are typically separated by 120 degrees.

In order for a VSI to produce AC voltages, it must have a DC voltage supply. These DC voltage supplies are typically provided to the inverter bridge by internal energy storage devices, such as capacitors. Other types of storage devices, however, are possible. It is these energy storage devices that provide the instantaneous current demanded by the switching inverter during the pulse width modulation.

Due to the power conversion nature of a switching inverter, the phase currents are related to the average DC bus current by the duty cycle of the pulse width modulation. During a large duty cycle, the supply current approaches the phase currents. Conversely, when the duty cycle of the PWM is small, the phase currents are much larger than the average supply current. When this occurs, the energy storage devices, typically capacitors, are required to deliver current pulses much larger than the average current draw. This pulse current creates a large ripple current load to the energy storage device. Consequently, the energy storage device must be designed to accommodate these ripple currents. This typically requires large size and/or quality of the capacitors which adds to the overall cost of the VSI.

Increasing the phase count at a given electrical power reduces the ripple current load on the energy storage devices, but only if the phase angles are evenly distributed. For example, the phase angle would be 120 degrees for a three-phase machine, 60 degrees for a six-phase machine, and so on.

One method of constructing a six-phase machine is to build two three-phase machines into a single frame. The two three-phase machines will have two sets of three-phase windings in either a delta or a wye configuration and a single rotor. The winding sets may or may not be magnetically coupled together or be wound on the same stator, but are electrically isolated from each other.

Such multi-phase machines are capable of being driven in such a way as to separate the physical winding angle from the ripple current. For example, assuming two sets of three-phase windings, each three-phase winding has a phase separation of 120 degrees. The phase angle from the two sets of three-phase windings can then be offset from each other from between 0 and 60 degrees. If the phase offset is 0 degrees, the two sets of three-phase windings essentially operate as two parallel three-phase machines. Conversely, if the phase offset between the two sets of three-phase windings were 60 degrees, the machine would be a completely balanced six-phase machine with 60 degrees per phase.

If the two sets of three-phase windings were driven by a normal SVM or other modulation scheme, at 0 degrees separation between the two winding sets, the ripple current would be equivalent to a single large three-phase machine having the power of two parallel machines combined. Conversely, if the phase shift between the two sets of three-phase windings is 60 degrees, the ripple current would be that of a six-phase machine having the same power.

It would be highly desirable to reduce the amount of ripple current from the voltage source inverters especially when the duty cycle of the PWM frequency is small. Reduction of the ripple currents would allow less expensive capacitors or other storage devices to be used with the inverters thus reducing the overall cost of the inverter.

SUMMARY OF THE PRESENT INVENTION

The present invention provides a modulation scheme for a voltage source inverter which overcomes the previously discussed disadvantages of the previously known inverters.

In brief, the present invention provides a three-phase voltage source inverter which, like the previously known inverters, includes two sets of three-phase windings. These windings may be either in a wye or delta configuration and the windings for each set of windings are offset by 60 degrees in phase relative to each other. The voltage source inverter is designed for use with a six-phase machine. As such, the phase offset or difference between the two sets of windings may vary anywhere between 0 and 60 degrees. The actual selected phase offset between the two sets of windings will vary as a function of the requirements of the driven six-phase machine.

As with the previously known voltage source inverters, pulse width modulation is utilized to convert the DC voltage from the DC energy storage devices, typically capacitors, to the AC voltage. A relatively high PWM frequency, e.g. 20 kilohertz, is used as the modulation frequency.

Unlike the previously known voltage source inverters, however, the phase angle of the PWM frequency between the two sets of windings is offset between 80 and 100 degrees and, preferably, substantially 90 degrees from each other. This offset of phase between the two PWM frequencies used to modulate the power from the DC storage device has been found to significantly reduce the ripple current to the DC storage devices, i.e. capacitors, as opposed to other phase angle differences between the two PWM frequencies. Since the ripple current to the DC storage devices is reduced, less expensive DC storage devices may be used without sacrifice of performance.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 2 is a prior art graph illustrating the pulse width modulation where the pulse width modulation for each winding set is in phase with each other;

FIG. 3 is a view similar to FIG. 2, but illustrating when the PWM frequency of the two winding sets are offset in phase 90 degrees relative to each other; and FIG. 4 is a chart illustrating the effect of varying the phase angle of the two PWM frequencies used to switch the two sets of windings.

DETAILED DESCRIPTION OF PREFERRED EMBODIMENTS OF THE PRESENT INVENTION

Figure 1:
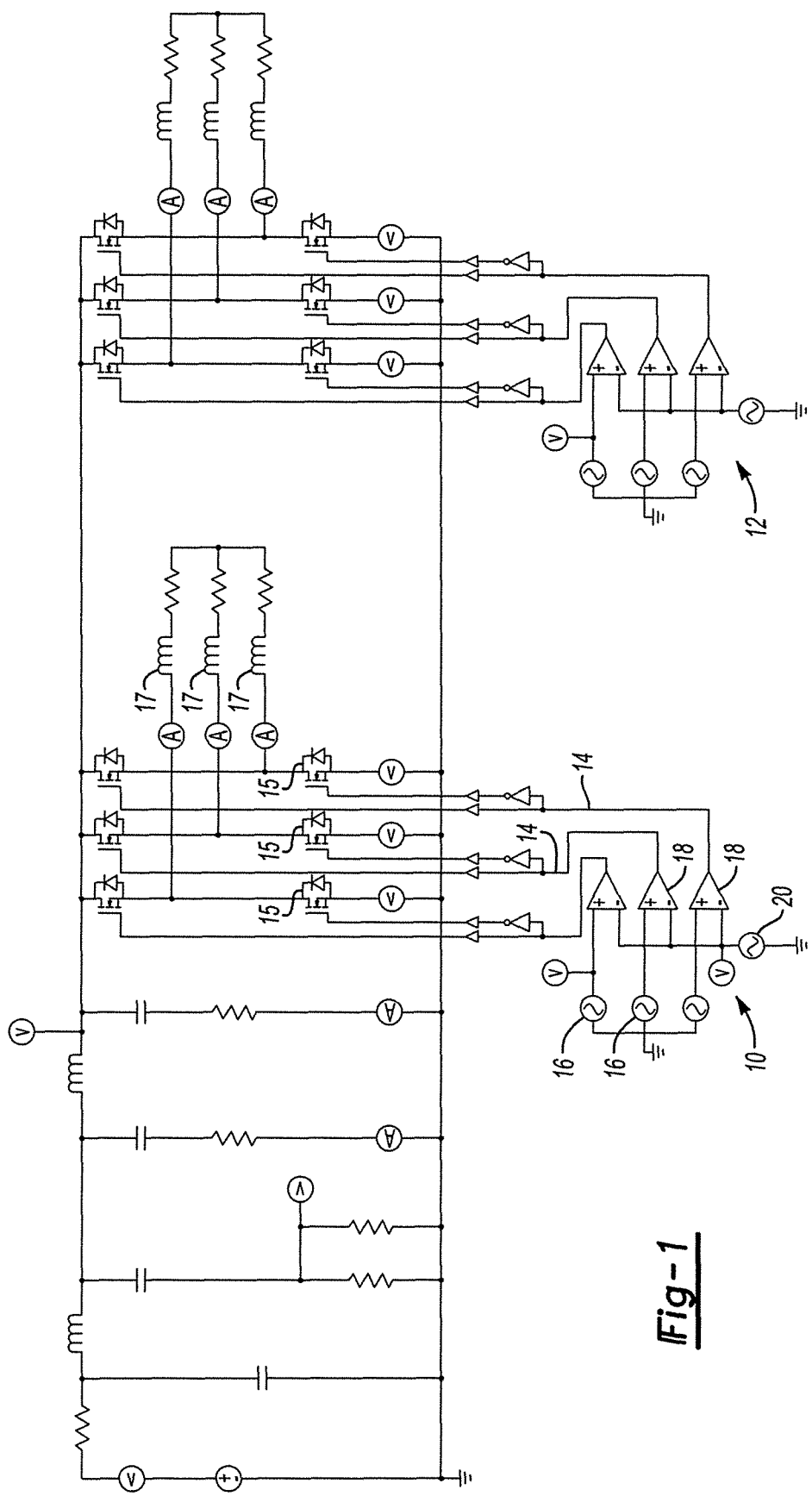
FIG. 1 is a view illustrating two PWM modulators.

With reference first to FIG. 1, two PWM modulators 10 and 12 are there shown as a part of the six-phase voltage source inverter. Since both modulators are the same in general construction, only the modulator 10 will be described, it being understood that a like description shall also apply to the modulator 12.

The PWM modulator 10 produces high side and low side gate signals for its three phases at the outputs 14. The gate signals are applied to their respective power devices 15 in the three-phase inverter bridge to generate the three-phase currents in the motor windings 17.

A three-phase voltage source 16 is associated with each AC voltage output 14. Each voltage source 16 is electrically connected through a comparator 18 to its associated outputs 14. The motor frequency of the three-phase voltage sources 16 is determined by the motor rpm and pole count, typically between 1 and several hundred hertz.

A PWM tri wave generator 20 is connected as the second input to each of the comparators 18. The PWM generator 20 operates at a substantially higher frequency than the maximum expected motor frequency, e.g. 20 kilohertz, and preferably generates a triangular waveform. That triangular waveform is compared to the three-phase voltage source 16 to generate the pulse width modulated signal at the outputs 14 from the modulator 10. Any conventional means may be used to generate the pulse width modulation for the modulator 10 such as microprocessors, ASICs, etc.

With reference now to FIG. 2, assuming that the triangular wave output from the tri wave generators 20 for both modulators 10 and 12 are in phase with each other, effectively a single triangular waveform 30 is generated in which the output signals from both tri wave generators 20 are in phase with each other. This signal is then compared to the three-phase sine source to generate pulse width signal 32 as the output from the modulators 10 and 12.

With reference now to FIG. 3, unlike the previously known VSIs, the outputs 34 and 36 from the PWM tri wave generators are not synchronized in phase as shown in FIG. 2, but rather are offset from each other by between 80 and 100 degrees, and preferably substantially 90 degrees. One triangular signal 34 is pulse width modulated to control its associated switching device 18 on the modulator 10 while the second triangular waveform 36 is used to control the pulse width modulation of the switching signal for the second modulator 12.

With reference now to FIG. 4, a chart is shown illustrating the effect of shifting the phase of one PWM frequency relative to the other. In particular, column 40 lists the phase offset between the three-phase sinewave sources 16 between the two modulators. Thus, row 42 illustrates the two three-phase outputs in synchronism with each other while rows 44 and 46 respectively represent the AC output voltage from the two modulators 10 and 12 offset in phase from each other by 30 degrees and 60 degrees, respectively. Thus, when the phase offsets of the output AC voltages are in phase with each other, that is equivalent to a single three-phase machine. Conversely, when the phase angle is offset by 60 degrees as shown in row 46, a balanced six-phase machine is obtained. Thirty degrees phase shift shown in column 44 is selected by example only.

It should also be noted that in rows 42-46, the phase angle offset or TRI angle in column 64 between the PWM frequencies for both modulators 10 and 12 are in phase with each other. This, in turn, produces a ripple current between 111 amps for a balanced six-phase machine to 155 amps for two parallel three-phase machines.

Still referring to FIG. 4, columns 48-62 all represent a voltage source inverter having a phase shift of 30 degrees between the three-phase alternating current outputs from the two modulators 10 and 12. In column 64, however, the phase angle between the PWM wave modulators is varied from 0 to 180 degrees. In doing so, the ripple current, shown in column 66, decreases from a high of approximately 125 at both 0 degrees and 180 degrees, to a low of about 87 amps at a phase shift of 90 degrees.

Consequently, by varying the phase shift between the PWM frequencies between the two modulators by between 80 and 100 degrees, and preferably substantially 90 degrees, a significant reduction in the ripple current is produced.

Consequently, it can be seen that the present invention provides an electrical power system for a six-phase electric motor. The power system includes a first set of three-phase windings and a second set of three-phase windings.

A first pulse width modulator operating at a conversion frequency, e.g. above 10 kilohertz and preferably 20 kilohertz, and at a first phase is electrically connected to the first set of three-phase windings. This first pulse width modulator converts a DC power source to the alternating current to electrically power the motor. This first pulse width modulator is electrically connected to the first set of phase windings.

Similarly, a second pulse width modulator also operates at the same conversion frequency as the first pulse width modulator and at a second electrical phase. The second pulse width modulator converts the DC power source to an alternating current to power the second set of three-phase windings. The second pulse width modulator is electrically connected to the second set of three-phase windings.

The first and second phases of the first and second pulse width modulators are offset from each other preferably between 80-100 degrees and more preferably 90 degrees. By offsetting the phases of the outputs from the two pulse width modulators, the peak ripple currents for the two three-phase sets of windings as compared to the previously known six-phase electrical motors in which the two three-phase windings are energized in phase with each other.

From the foregoing, it can be seen that the present invention provides an electrical power system for a six-phase electrical motor which greatly reduces the peak current flow of the electrical windings. Having described my invention, however, many modifications thereto will become apparent to those skilled in the art to which it pertains without deviation from the spirit of the invention as defined by the scope of the appended claims.

I claim:

1. An electrical power system for a six-phase electric motor comprising:
a first set of three-phase windings,
a second set of three-phase windings,
a first pulse width modulator operating at a conversion frequency and a first phase which converts a DC power source to an alternating current, said first pulse width modulator being electrically connected to said first set of three-phase windings, a second pulse width modulator operating at said conversion frequency and a second phase which converts said DC power source to an alternating current, said second pulse width modulator being electrically connected to said second set of three-phase windings, wherein said first and second phases are offset from each other by between 80 and 100 degrees to thereby reduce ripple current in said windings.

2. The invention as defined in claim 1 wherein said second phase is offset from said first phase by substantially 90 degrees.

3. The invention as defined in claim 1 wherein said conversion frequency exceeds 10 kilohertz.

* * * * *